April 23, 1968  H. A. RASCHKE  3,380,022

VEHICLE BACK-UP WARNING DEVICE

Filed Feb. 23, 1966

INVENTOR.
HERBERT A. RASCHKE
BY
Townsend and Townsend
ATTORNEYS

United States Patent Office 3,380,022
Patented Apr. 23, 1968

3,380,022
VEHICLE BACK-UP WARNING DEVICE
Herbert A. Raschke, Greenbrae, Calif., assignor to
E. D. Bullard Company, Sausalito, Calif.
Filed Feb. 23, 1966, Ser. No. 529,553
6 Claims. (Cl. 340—70)

ABSTRACT OF THE DISCLOSURE

A back-up alarm sounder comprising an electric horn, a switch for establishing or disconnecting power to the horn and a code wheel having an irregular periphery for opening and closing the switch in accordance with the particular shape of the periphery. The code wheel is driven by a small motor which is energized only when the vehicle on which the system is mounted is moved in the reverse direction so that an irregular tone is produced when the vehicle is backed up. The code wheel is attached by a quickly disconnectable joint so that code wheels having different shaped peripheries can be readily substituted.

---

This invention relates to a back-up alarm for a vehicle and more particularly to such back-up alarm in which the time relationship or sound pattern of the audible signals produced by the alarm is quickly changeable.

In work areas in which one or more vehicles are employed, safety requirements dictate that such vehicles be provided with an audible alarm which sounds when the vehicle backs up in order to warn those in the area that a vehicle is moving in a direction in which the vehicle operator's field of vision is obscured. A cyclic or periodic tone has been found to be more noticeable and prominent to those proximate the vehicle than a steady tone. Even with such cyclic or repetitive tones however, it has been observed that most if not all persons eventually develop a psychologic immunity to a given sound pattern and do not respond when hearing such sound pattern.

Therefore, it is an object of this invention to provide a back-up alarm sounder that can be readily altered to establish a different sound pattern. The present invention affords such alteration by substitution of a single element so that such element can be changed at intervals to avoid development of the abovementioned psychologic immunity.

A feature and advantage of this invention is that in a work area in which two or more vehicles are used, back-up alarms producing different sound patterns can be installed on the various vehicles both to identify the specific vehicle to the persons working around the vehicles and to at least delay development of the psychologic immunity mentioned above.

In the specific embodiment of the invention described in more detail hereinafter a constant speed motor is energized only when a vehicle moves in a rearward direction, and removably mounted on the shaft of such motor is a code wheel having an irregular periphery against which the actuating arm of an electric switch is disposed. Such switch is opened and closed in a time relationship proportional to the pattern of irregularity on the code wheel periphery and the contact is connected in series with an electric horn or electro-responsive like sounder. Substitution of the code wheel by one having a different peripheral pattern establishes a different sound pattern produced by the sounder.

Other objects, features and advantages will be more apparent after referring to the following specification and accompanying drawing in which.

Figure 1:
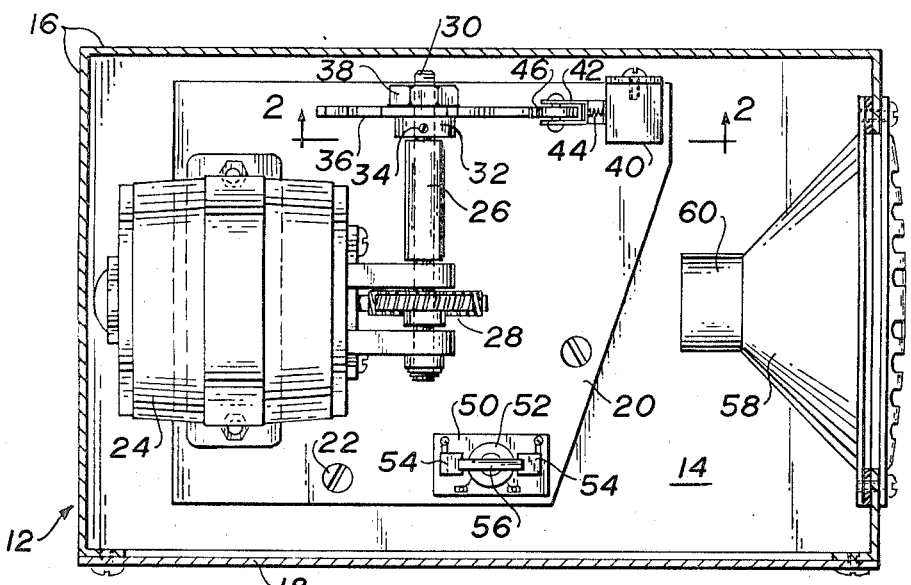
FIG. 1 is a plan view of the apparatus of the present invention with the top cover removed to reveal internal details of construction.

Referring more particularly to the drawing reference numeral 12 indicates a case or box having a bottom panel 14, fixed side panels 16, and a removable side panel 18 for affording access to the box interior. The box includes a conventional top panel, which is not shown in the drawing so as to reveal internal details. A base 20 is removably secured to bottom panel 14 by one or more threaded fasteners 22. Mounted on base 20 is a DC motor 24 which drives a shaft 26 through a conventional worm gear mechanism 28. On the end of shaft 26 remote from gear mechanism 28 is a threaded end portion 30 and a collar 32 inwardly of the threaded portion. Collar 32 is secured to shaft 26 by any suitable expedient, such as a set screw 34.

A code wheel 36 is centrally apertured for receipt on the end of shaft 26, and a nut 38 is provided for threaded engagement with threaded portion 30 of the shaft of removably mount the code wheel onto the shaft for rotation therewith. Mounted on base 20 adjacent the periphery of code wheel 36 is a switch 40 having an actuator arm 42 that is resiliently biased by a spring 44 into bearing relation with the periphery of code wheel 36. Arm 42 can be provided with a roller 46 in a conventional way for reducing friction between the arm and the periphery of the code wheel. Switch 40 includes an electrical contact 48 which is opened in response to the force of spring 44. Also mounted on base 20 is a relay 50 having a low power coil 52, fixed high current contacts 54, and an armature 56 that bridges the fixed contacts when coil 52 is energized. The relay is provided for increasing the current capacity of the apparatus, contacts 48 of switch 40 typically being of relatively low capacity.

From FIG. 1 it will be noted that the elements referred to are all secured to base 20 which in turn is removably mounted in box 12. This characteristic of the apparatus not only expedites replacement or substitution of code wheel 36, but facilitiates repair of the apparatus should such become necessary. An electro-responsive sounder 58 is mounted in a side panel of box 12; the sounder is here shown as an electric horn which includes a member that vibrates in response to application of current to a coil 60 to produce an audible tone. The horn is intended to exemplify any sound-producing device which responds to application of electric power to produce an audible tone. An obvious equivalent of such horn is a solenoid air valve for controlling a supply of compressed air to a conventional air horn.

Figure 5:
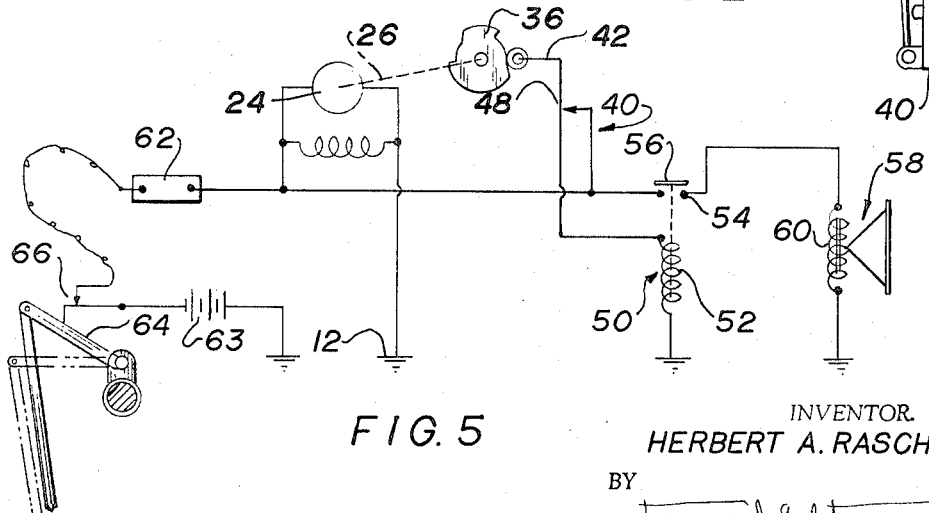
FIG. 5 is an electrical schematic diagram of the back-up alarm of the present invention.

Referring to FIG. 5 the apparatus is provided with a power input connecter 62 to which connecter is connected one side of motor 24, one side of contact 48, and one fixed relay contact 54. The other side of motor 24 is grounded to case 12 as is one side of relay coil 52. The other side of contact 48 is connected to the other side of relay coil 52. Therefore, when contact 48 is closed, power supplied through connecter 62 is applied to coil 52 as a consequence of which armature 56 bridges fixed contacts 54 to supply power to sounder 58.

The vehicle in which the back-up alarm of this invention is installed includes a battery 63, one side of which is grounded to the frame of the vehicle. Such vehicles typically have a transmission that includes a lever 64 which is moved to the position shown by solid lines in FIG. 5 when the vehicle is backed up. Adjacent lever 64 is a switch 66 having contacts which are closed only when the vehicle is backed up. Switch 66 acts to supply power from battery 63 to input connecter 62 of the back-up alarm apparatus when the vehicle is ready for rearward movement. Switch 66 and its cooperation with lever 64 is intended to exemplify any expedient for establishing an electrical circuit to connecter 62 only when the vehicle is backed up. Other expedients for this purpose will occur to those skilled in the art.

Figure 2:
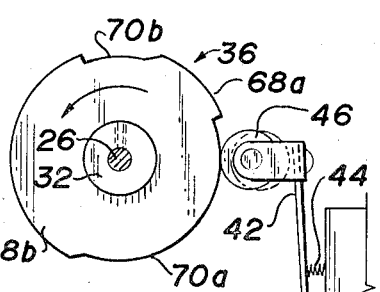
FIG. 2 is a view taken substantially along line 2—2 of FIG. 1 and showing one form of code wheel of the present invention.

In operation when a vehicle having the apparatus of this invention is backed up, power is supplied to the apparatus through connecter 62, and motor 24 rotatively drives shaft 26 and code wheel 36. As seen most clearly in FIG. 2, code wheel 36 includes relatively large radius peripheral portions 68a and 68b, relatively small radius peripheral portions 70a and 70b. When code wheel 36 is in the position shown in FIG. 2, i.e., with switch arm 42 in engagement with peripheral portion 70a, contact 48 is open and sounder 58 is silent. Because peripheral portion 70a has a relatively long circumferential extent, the period of silence will be of relatively long duration. As code wheel 36 continues to rotate peripheral portion 68b bears against actuator arm 42 to close contact 48 and energize sounder 58 so that a tone is produced. Such tone is of relatively long duration because the circumferential extent of peripheral portion of 68b is relatively large. As peripheral portion 70b rotates to a position opposite actuator arm 42, contact 48 is again open and sounder 58 is again silenced. The period of silence in response to rotation of peripheral portion 70b past switch 40 will be of relatively short duration since the circumferential extent of portion 70b is relatively small. Further rotation of the code wheel moves peripheral portion 68a into a position opposite switch 40, as a consequence of which switch 48 is closed for a short duration due to the relatively short circumferential extent of peripheral portion 68a and a tone of corresponding duration is produced. It will be appreciated that the sound pattern produced by sounder 58 will recur cyclically so long as switch 66 is closed to supply power to the apparatus, and that such sound pattern will be characterized by a relatively long tone, a relatively long period of silence, a relatively short tone and a relatively short period of silence.

Figure 3:
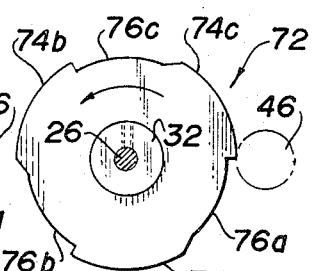
FIG. 3 is a view similar to FIG. 2 showing another form of code wheel.

Although the last-mentioned sound pattern is effective in calling attention to the fact that a vehicle is backing up, continual exposure to such sound pattern usually evokes in the listener a psychologic immunity to such pattern. The consequence of such psychologic immunity is that workmen adjacent the vehicle will be less alert to the approach of the vehicle, the degree of alertness being roughly inversely proportional with time. Accordingly, the present invention provides for ready substitution of code wheel 36 by, for example, a code wheel 72. (See FIG. 3.) Code wheel 72 can be quickly substituted by removal of nut 38 and replacement thereof when the substituted code wheel is in place on shaft 26. Code wheel 72 includes a plurality of relatively large radius portions 74a, 74b, and 74c, circumferentially interposed between which are relatively small radius peripheral portions 76a, 76b, and 76c. It will be obvious that sounder 58 produces sound each time peripheral portions 74 are opposite roller 46 of arm 42 and that sounder 58 will be silent when peripheral portions 76 are opposite the roller. The sound pattern produced by code wheel 72 is characterized by three sound pulses of equal duration interrupted by three silent periods of substantially equal duration for each rotation of the code wheel.

Figure 4:
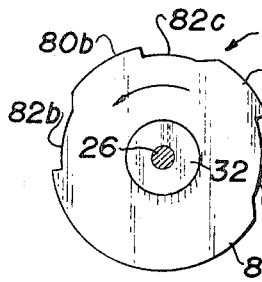
FIG. 4 is a view similar to FIG. 2 showing still another form of code wheel.

Still another sound pattern is afforded by code wheel 78 (see FIG. 4) which has relatively large radius peripheral portions 80a, 80b and 80c and relatively small radius peripheral portions 82a, 82b and 82c. With code wheel 78 mounted on shaft 26, sounder 58 produces a sound pattern characterized by a tone of relatively long duration (80a), a silent period of relatively short duration (82b), a tone of relatively short duration (80b), a silent period of relatively short duration (82c), a tone of relatively short duration (80c) and a silent period of relatively short duration (82a). Such sound pattern is cyclically repeated as motor 24 continues to rotatively drive code wheel 78.

At work sites wherein a number of this type vehicles are present, it has been found particularly effective to provide different code wheels on different types of apparatus. For example, all forklift trucks on a site can be provided with back-up alarms having code wheels typified at 36, all bulldozers can have code wheels typified by 72, and all trucks can have a code wheel typified by 78. By employment of such combination, the establishment of the above-mentioned psychologic immunity is not only avoided, but the workmen on the site are able to identify the particular type of vehicle that may be approaching them in a rearward direction. Safety to all on the jobsite is thereby improved.

Thus it will be seen that the present invention provides a back-up alarm that is extremely simple and rugged, and which back-up alarm affords a plurality of readily changed sound patterns. Periodic substitution of different code wheels is accomplished expeditiously since the code wheels are removably mounted on shaft 26, and such substitution avoids creation of psychologic immunity to a particular sound pattern.

Although one embodiment of the present invention has been shown and described, it will be obvious that other adaptations and modifications can be made without departing from the true spirit and scope of the invention.

What is claimed is:

1. A back-up alarm for a wheeled vehicle comprising a shaft, means responsive to rearward movement of the vehicle for rotatably driving the shaft at a substantially constant speed independent of vehicle speed, a code wheel removably mounted on said shaft for rotation therewith, said code wheel having an irregular peripheral surface, a switch having a normally open contact and an actuating arm contacting the peripheral surface of said code wheel, so that on rotation thereof said contact is cyclically opened and closed, an electroresponsive sounder, and means for connecting said normally open contact in series with said sounder.

2. The back-up alarm of claim 1 wherein said rearward movement responsive shaft driving means includes means for closing an electric circuit only when said vehicle is moving in a rearward direction, and a motor connected in series with said circuit closing means so as to be energized only when said circuit is closed.

3. The back-up alarm of claim 2 wherein said motor is adapted for constant speed rotation so that the sound pattern produced by said sounder is uniformly cyclically repeated in response to rotation of said code wheel.

4. The back-up alarm of claim 1 wherein said shaft includes a threaded portion on one end thereof and wherein said code wheel is centrally apertured to receive said threaded portion, in combination with an interiorly threaded member engageable with said threaded portion for removably mounting said wheel on said shaft.

5. A back-up alarm for a wheeled vehicle comprising an electrical contact movable between an opened position when the vehicle is moving in a forward direction and a closed position when the vehicle is moving in a rearward direction, an electro-responsive sounder, and means in series with said contact and said sounder for cyclically energizing said sounder at a constant repetition rate independent of vehicle speed and in response to closure of said contact, said energizing means including a substitutable element for establishing the time relationship of the cyclical energization afforded by said energizing means.

6. The back-up alarm according to claim 5 in which said cyclically energizing means includes a motor connected to said contact for rotation only when said contact is closed, a switch having a follower and being mounted adjacent said motor, and wherein said substitutable element comprises a code wheel having an irregular periphery driven by said motor and disposed to bear against said follower so that said switch opens and closes in a time relationship corresponding to the peripheral shape of said code wheel, said switch being connected in series with said sounder.

References Cited

UNITED STATES PATENTS 3,214,731  10/1965  Ballard _____ 340—70

JOHN W. CALDWELL, *Primary Examiner.*

ALVIN H. WARING, *Examiner.*